(12) United States Patent  (10) Patent No.: US 7,411,127 B2
Viguerie  (45) Date of Patent: Aug. 12, 2008

(54) ELECTRICAL WIRE AND A METHOD OF STRIPPING THE INSULATION THEREOF

(75) Inventor: Michael C. Viguerie, Capitola, CA (US)

(73) Assignee: Medconx, Inc., Santa Clara, CA (US)

( * ) Notice: Subject to any disclaimer, the term of this patent is extended or adjusted under 35 U.S.C. 154(b) by 0 days.

(21) Appl. No.: 10/369,903

(22) Filed: Feb. 18, 2003

(65) Prior Publication Data

US 2004/0159458 A1    Aug. 19, 2004

(51) Int. Cl.
H02G 15/02 (2006.01)
H01B 7/00 (2006.01)
B23P 23/00 (2006.01)

(52) U.S. Cl. .............. 174/74 R; 174/110 R; 174/110 N; 29/564.4

(58) Field of Classification Search ............ 174/36, 174/110 R, 110 SR, 110 N, 120 R; 228/179, 228/203, 205, 214, 227, 229, 230; 219/121.6, 219/121.61, 121.68, 121.69; 29/564.4
See application file for complete search history.

(56) References Cited

U.S. PATENT DOCUMENTS 3,953,650 A * 4/1976 Sauer et al. ............... 428/389
4,537,804 A * 8/1985 Keane et al. ............... 427/118
4,819,329 A * 4/1989 Haley et al. ................. 29/860
5,201,903 A * 4/1993 Corbett et al. .............. 29/872
5,288,588 A * 2/1994 Yukawa et al. ............ 430/192
5,337,941 A * 8/1994 Higashiura et al. ........ 228/205
5,401,787 A * 3/1995 Tonyali ..................... 524/101
6,239,376 B1 * 5/2001 Kimura et al. .......... 174/110 R
6,509,547 B1 * 1/2003 Bernstein et al. ....... 219/121.68
2003/0019656 A1 * 1/2003 Ajiki ..................... 174/110 R

FOREIGN PATENT DOCUMENTS

DE           284445 A    * 11/1990
FR          2595181 A    *  9/1987

OTHER PUBLICATIONS

Micro-Chem Product Brochure entitled "NanoTM SU-8 Negative Tone Photoresist Formulations 50-100", 4 pages, dated Feb. 2002.

* cited by examiner

Primary Examiner—William H Mayo, III
(74) Attorney, Agent, or Firm—Jones Day

(57) ABSTRACT

An electrical wire has a central electrically conductive member such as copper, aluminum, gold or silver or admixtures or alloys thereof, coated by a photoresistive insulator, preferably of a negative photoresistive material such as polyimide. A non-mechanical method of stripping a desired portion of the length of the insulator from the electrical wire comprises exposing the desired length of the electrical wire to a source of UV light. The UV light then "softens" the insulator which either evaporates or can be dissolved by immersing it in a solvent.

9 Claims, 1 Drawing Sheet

ELECTRICAL WIRE AND A METHOD OF STRIPPING THE INSULATION THEREOF

TECHNICAL FIELD

The present invention relates to an electrical wire and more particularly to an electrical wire which is used in an improved method for stripping a desired length of insulation therefrom to expose the conductive member.

BACKGROUND OF THE INVENTION

An electrical wire comprising an electrically conductive member with an insulator surrounding the member is well known in the art. Typically, in the prior art, electrical wires are used to electrically connect different electrical or electronic components. In so doing, the insulator surrounding the electrically conductive member must be removed so that the electrically conductive member, typically a metal such as gold, silver, or more commonly copper or aluminum, can then be electrically connected to the electrical or electronic components by solder or the like. In order to remove the insulator which surrounds the electrically conductive member, wire strippers or other mechanical devices have been used. In a wire stripper, a plier like device having a hole with a sharp edge is used. The hole is approximately the size of the electrically conductive member. As the stripper is squeezed or engages the outer insulator, it cuts the outer insulator. However, since there is a hole that is approximately the size of the electrically conductive member, the stripper stops and does not cut into the electrically conductive member. The user then exerts a force by pulling the insulator away. Sometimes, in the process of so doing, the stripper may hit or nick the electrically conductive member. In other cases, the pulling may cause a tear in the insulator coating, thereby stripping more or less than the desired amount. Other mechanical methods for stripping the insulation include the use of a knife to cut the insulation and then pull the cut insulation. However, the problems of potentially nicking the electrically conductive member and the inaccuracy of the amount of insulation stripped remains. Still other methods have included the use of sand paper or other abrasive techniques to remove the insulation.

The aforementioned problems of stripping an electrical wire are exacerbated as the size of the wire decreases. As the wires become smaller and smaller to connect smaller components, or are used in confined spaces, the electrically conductive member becomes extremely small and the insulator surrounding it is also very small. Thus, the tolerance between the outer diameter of the electrical wire and the outer diameter of the electrically conductive member is very small. This increases the risk that using a stripper or other mechanical means can nick or cut the electrically conductive member and/or the mechanical device can remove more or less of the insulator than is desired.

SUMMARY OF THE INVENTION

An electrical wire comprises an electrically conductive member with a photoresistive insulator coating the member.

The present invention also relates to a method of stripping a desired length of insulator from an electrical wire. The wire has an electrically conductive member and an insulator coating the member. The insulator is a negative photoresistive material which is sensitive to UV light. The method of stripping comprises exposing the desired length of the wire to a source of UV light sufficient to dissipate the desired length of insulator. Alternatively, the method comprises exposing the desired length of wire to a source of UV light and then immersing the exposed wire in a solvent to dissolve the desired length of photoresistive material.

BRIEF DESCRIPTION OF THE DRAWING FIGURES

DETAILED DESCRIPTION OF THE INVENTION

Figure 1:
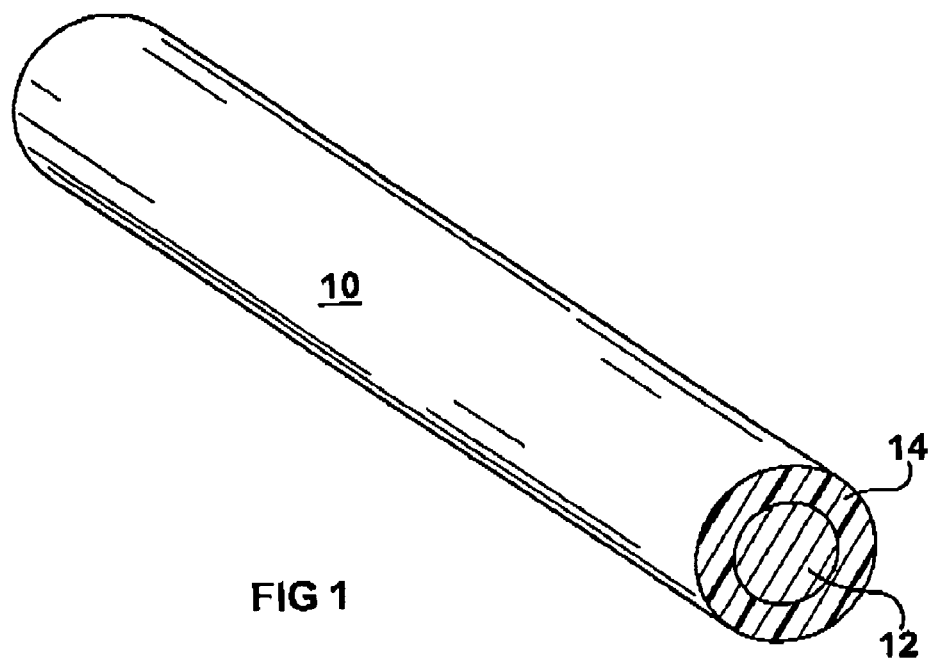
FIG. 1 is a perspective view of an improved electrical wire of the present invention.

Referring to FIG. 1, there is shown an electrical wire 10 of the present invention. The electrical wire 10 comprises an electrically conductive member 12. Typically, the electrically conductive member 12 is a metal and is selected from a group consisting of gold, silver, copper, aluminum, admixtures thereof, or alloys thereof. The electrically conductive member 12 can also comprise a strand, which is a plurality of small wires made from any of the foregoing described metals. Surrounding the electrically conductive member 12 is a photoresistive insulator 14 coating the member 12. The method of the present invention can be used with both positive or negative photoresist material as the insulator 14.

The photoresistive insulator 14, in the preferred embodiment, is a negative photoresistive material which is sensitive to UV light. A negative photoresistive material, as known by those of skill in the lithography art, is a material which cures when exposed to the appropriate light source and any unexposed portion of the photoresist material dissolves when immersed in a solvent. A positive photoresistive material is a material which, when exposed to the appropriate light source becomes soft and either dissipates into the atmosphere or dissolves when immersed in a solvent. With the positive photoresist material, the remaining unexposed portions of the photoresistive material, i.e., those portions which have not been exposed to the appropriate light source, will not dissipate into the atmosphere and will not dissolve in the solvent. With the negative photoresist material, the material that was exposed to the UV light source is unaffected by the solvent due to the curing effect of the light source on the negative photoresist material, as known by those of skill in the art.

In a preferred embodiment, the negative photoresistive material is a material made from polyimide, such as a commercially available chemical designated SU-8 100, a photoresist solder mask commonly used in the lithography field. Further, the light source to which the photoresist insulator 14 is sensitive is in the UV light range.

One example, in the context of the negative photoresist material, is to expose a portion of the wire 10 to a dose of 610 mJ/cm$^2$, while covering or obscuring the portion of the wire that is desired to be stripped. After the wire 10 is exposed, it is immersed in an SU-8 developer, which is a PM acetate. The PM acetate is stirred for about 25 minutes. The unexposed portion of the insulator is removed by the immersion process. The wire 10 is then rinsed using isopropyl alcohol and dried with air or nitrogen.

Figure 2:
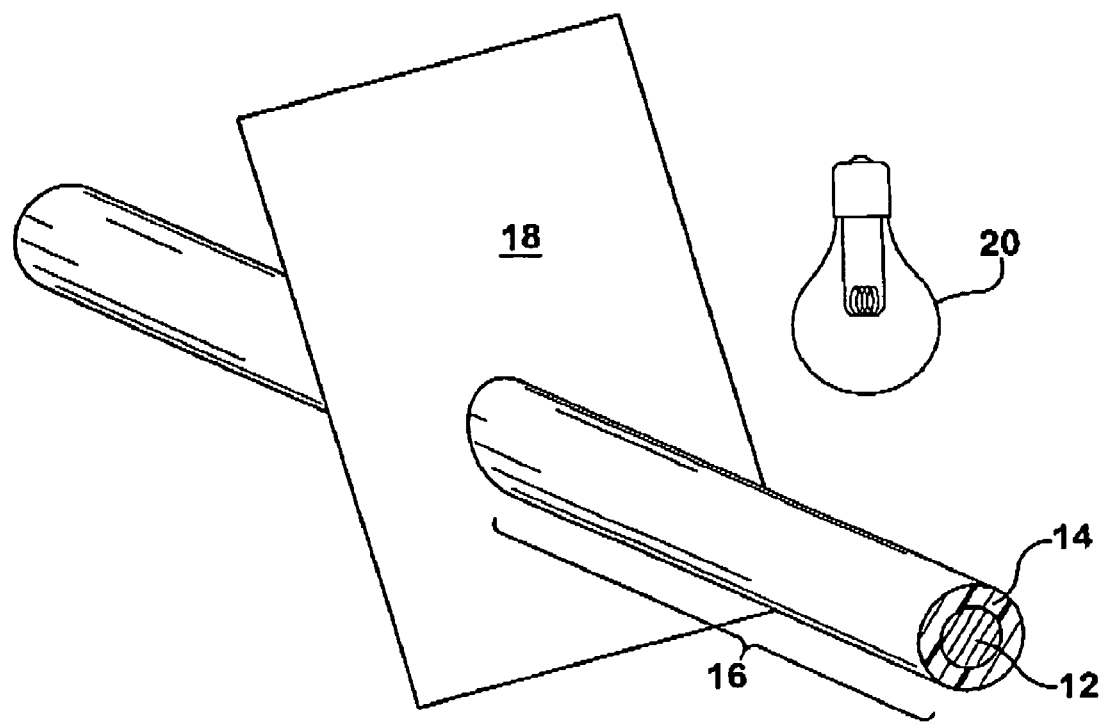
FIG. 2 is a perspective view of the method of the present invention to strip a desired length of insulator from an electrical wire.

Referring to FIG. 2, there is shown a step in the method of the present invention. In the method of the present invention, a desired length 16 of the wire 10 of the present invention is to be stripped of the insulator 14. In the context of a positive photoresist material for insulator 14, the desired length 16 of the wire length 10 is exposed to a UV light source 20. In a preferred embodiment, a blocking panel 18 serves to block the rest of the wire 10 from the exposure of the UV light 20. Thus, for example, the panel 18 can be a box and the UV light 20 can be contained within the box 18 and the wire 10 inserted through an aperture into the box 18 such that a desired length 16 is placed inside the box 18. When the UV light 20 is activated, the desired portion of the wire 10 is then exposed inside the box 18.

As previously described, the insulator 14 of this example is preferably made of a positive photoresistive material, such as polyimide. If the insulator 14 is sufficiently thinly coated about the electrically conductive member 12, it is possible that upon exposure to the UV light 20, the desired portion 16 will soften and will dissipate into the atmosphere. On the other hand, if the insulator 14 is thick, then after the desired portion 16 is exposed to the UV light 20, the wire 10 is immersed in a solvent. The solvent would dissolve that portion of the insulator 16 which has been exposed to UV light. The solvent would not dissolve the portion of the insulator 14 not exposed to the UV light, even if it were immersed in the solvent.

Where a negative photoresistive material is used, as known by those of skill in the lithography art, the portion of the material that is desired to be maintained is exposed to a UV light source, which cures the material. The unexposed portion of the material would then be immersed in a solvent in order to dissolve the unexposed portion of the material to reveal the underlying surface. When the negative photoresistive material is applied as a coating to a wire, the same thing occurs. The coating can be removed by exposing part of the wire to a UV light source and the portion of the coating that was not exposed would be dissolvable in a solvent or would dissipate into the atmosphere.

What is claimed is:

1. A method of preparing a wire for attachment to an electrical or electronic component by soldering, the wire having a conductive member covered by an insulator formed of UV-sensitive photoresistive material, the method comprising:
    removing the entire thickness of the insulator from a desired length of the wire prior to soldering the wire, and maintaining the insulator on a remaining length of the wire, by:
    exposing the insulator on the desired length of the wire to UV light, or alternatively exposing the insulator on the remaining length of the wire to UV light, while shielding the unexposed length of the insulator from the UV light;
    immersing the wire in a photoresistive development solvent to dissolve the desired length of the insulator; and
    removing the immersed wire from the photoresistive development solvent, whereby the desired length of the electrically conductive member is placed in an uncovered and unattached condition of readiness for attachment to the electrical or electronic component by soldering.

2. A method as defined in claim 1 further comprising the steps of rinsing and drying the uncovered and unattached length of the electrically conductive member.

3. A wire prepared by the method defined in claim 1.

4. A method of preparing a wire for attachment to an electrical or electronic component by soldering, the wire having a conductive member covered by an insulator formed of UV-sensitive photoresistive material, the method comprising:
    removing the entire thickness of the insulator from a desired length of the wire prior to soldering the wire, and maintaining the insulator on a remaining length of the wire, by:
    exposing the insulator on the remaining length of the wire to UV light while shielding the insulator on the desired length of the wire from the UV light;
    immersing the desired and remaining lengths of the wire in a photoresistive development solvent to dissolve the desired length of the insulator; and
    removing the immersed lengths of the wire from the photoresistive development solvent, whereby the desired length of the electrically conductive member is placed in an uncovered and unattached condition of readiness for attachment to the electrical or electronic component by soldering.

5. A method as defined in claim 4 further comprising the steps of rinsing and drying the uncovered length of the electrically conductive member.

6. A wire prepared by the method defined in claim 4.

7. A method of preparing a wire for attachment to an electrical or electronic component by soldering, the wire having a conductive member covered by an insulator formed of UV-sensitive photoresistive material, the method comprising:
    removing the entire thickness of the insulator from a desired length of the wire prior to soldering the wire, and maintaining the insulator on a remaining length of the wire, by:
    exposing the insulator on the desired length of the wire to UV light sufficiently to cause the exposed insulator to dissipate without the action of a solvent, while shielding the insulator on the remaining length of the wire from the UV light; and
    allowing the exposed insulator to dissipate from the desired length of the wire without the action of a solvent, whereby the desired length of the electrically conductive member is placed in an uncovered and unattached condition of readiness for attachment to the electrical or electronic component by soldering.

8. A method as defined in claim 7 wherein the development process further comprises the steps of rinsing and drying the uncovered length of the electrically conductive member.

9. A wire prepared by the method of claim 7.

* * * * *